US006549438B2

(12) United States Patent
Malone

(10) Patent No.: US 6,549,438 B2
(45) Date of Patent: Apr. 15, 2003

(54) AC-TO-DC CONVERTER CIRCUIT UTILIZING IGBT'S FOR IMPROVED EFFICIENCY

(75) Inventor: Douglas J. Malone, Battleground, WA (US)

(73) Assignee: Precision Automation, Inc., Vancouver, WA (US)

( * ) Notice: Subject to any disclaimer, the term of this patent is extended or adjusted under 35 U.S.C. 154(b) by 0 days.

(21) Appl. No.: 09/845,718

(22) Filed: Apr. 30, 2001

(65) Prior Publication Data

US 2002/0159279 A1 Oct. 31, 2002

(51) Int. Cl.[7] ............................................. H02M 7/217
(52) U.S. Cl. ...................................... 363/89; 363/127
(58) Field of Search ................................... 363/89, 127

(56) References Cited

U.S. PATENT DOCUMENTS

| | | | |
|---|---|---|---|
| 3,576,443 A | 4/1971 | Brown .......................... 307/12 |
| 3,675,111 A | 7/1972 | Sakka et al. | |
| 3,942,090 A | 3/1976 | Matthes et al. | |
| 4,145,592 A | 3/1979 | Mizukawa et al. ........... 363/78 |
| 4,161,022 A | 7/1979 | Kanazawa et al. ............ 363/88 |
| 4,447,868 A | 5/1984 | Turnbull ...................... 363/81 |
| 4,489,323 A | 12/1984 | Glennon et al. .............. 363/87 |
| 4,599,685 A | 7/1986 | Hombu et al. ................ 363/41 |
| 4,739,466 A | 4/1988 | Glennon et al. .............. 363/89 |
| 4,866,585 A | 9/1989 | Das ............................ 363/127 |
| 4,926,090 A | 5/1990 | Ricker et al. ............... 318/254 |
| 4,982,148 A | 1/1991 | Englemann ................. 323/207 |
| 5,051,883 A | * 9/1991 | Cheng ......................... 363/89 |
| 5,235,504 A | * 8/1993 | Sood .......................... 363/89 |
| 5,367,448 A | 11/1994 | Carroll ........................ 363/89 |
| 5,432,695 A | * 7/1995 | Vlatkovic et al. ........... 363/127 |
| 5,499,178 A | 3/1996 | Mohan ......................... 363/39 |
| 5,638,265 A | 6/1997 | Gabor ......................... 363/89 |
| 5,726,872 A | 3/1998 | Vinciarelli et al. ............ 363/89 |
| 5,729,120 A | 3/1998 | Stich et al. .................... 363/89 |
| 5,801,517 A | * 9/1998 | Borle ........................... 363/89 |
| 5,804,951 A | 9/1998 | Rivet ......................... 363/125 |
| 5,936,854 A | 8/1999 | Uesugi et al. ................ 363/84 |
| 5,978,243 A | * 11/1999 | Ishii et al. ..................... 363/89 |
| 5,995,395 A | 11/1999 | Rivet .......................... 363/88 |
| 6,031,745 A | 2/2000 | Southman et al. ............ 363/70 |
| 6,038,152 A | * 3/2000 | Baker ........................ 363/127 |
| 6,038,155 A | 3/2000 | Pelly .......................... 363/129 |
| 6,043,999 A | 3/2000 | Ehrenberg et al. ............ 363/89 |
| 6,055,171 A | 4/2000 | Ishii et al. ..................... 363/89 |
| 6,130,832 A | * 10/2000 | Julian ......................... 363/127 |
| 6,137,700 A | 10/2000 | Iida et al. ..................... 363/89 |
| 6,137,703 A | * 10/2000 | Julian et al. ................. 363/127 |
| 6,163,472 A | * 12/2000 | Colby ......................... 363/127 |
| 6,166,929 A | 12/2000 | Ma et al. ....................... 363/37 |
| 6,181,583 B1 | 1/2001 | Okui et al. .................... 363/45 |
| 6,191,676 B1 | 2/2001 | Gabor .......................... 363/89 |
| 6,337,802 B1 | * 1/2002 | Larsson et al. ............. 363/127 |

\* cited by examiner

Primary Examiner—Jeffrey Sterrett
(74) Attorney, Agent, or Firm—Kolisch Hartwell, P.C.

(57) ABSTRACT

An AC-to-DC converter furnishing a regulated DC-output voltage from an AC-input supply voltage which is converted with a rectifier that utilizes, in at least two of its legs, IGBT (insulated gate bipolar transistor) devices, preferably of the kind that have no internal diodes. Also included in the converter of this convention is circuitry which tracks zero-crossing events relative to AC-input voltage for the purpose of establishing switching signals and times for such signals for operating the IGBT devices, and wherein thorough-safe operation is associated with malfunctioning of the zero-crossing tracking subcircuitry whereby a failure in that circuitry will result effectively in a shut down of the entire converter, and a bleed down to zero of DC-output voltage.

9 Claims, 1 Drawing Sheet

AC-TO-DC CONVERTER CIRCUIT UTILIZING IGBT'S FOR IMPROVED EFFICIENCY

BACKGROUND AND SUMMARY OF THE INVENTION

Figure 1:
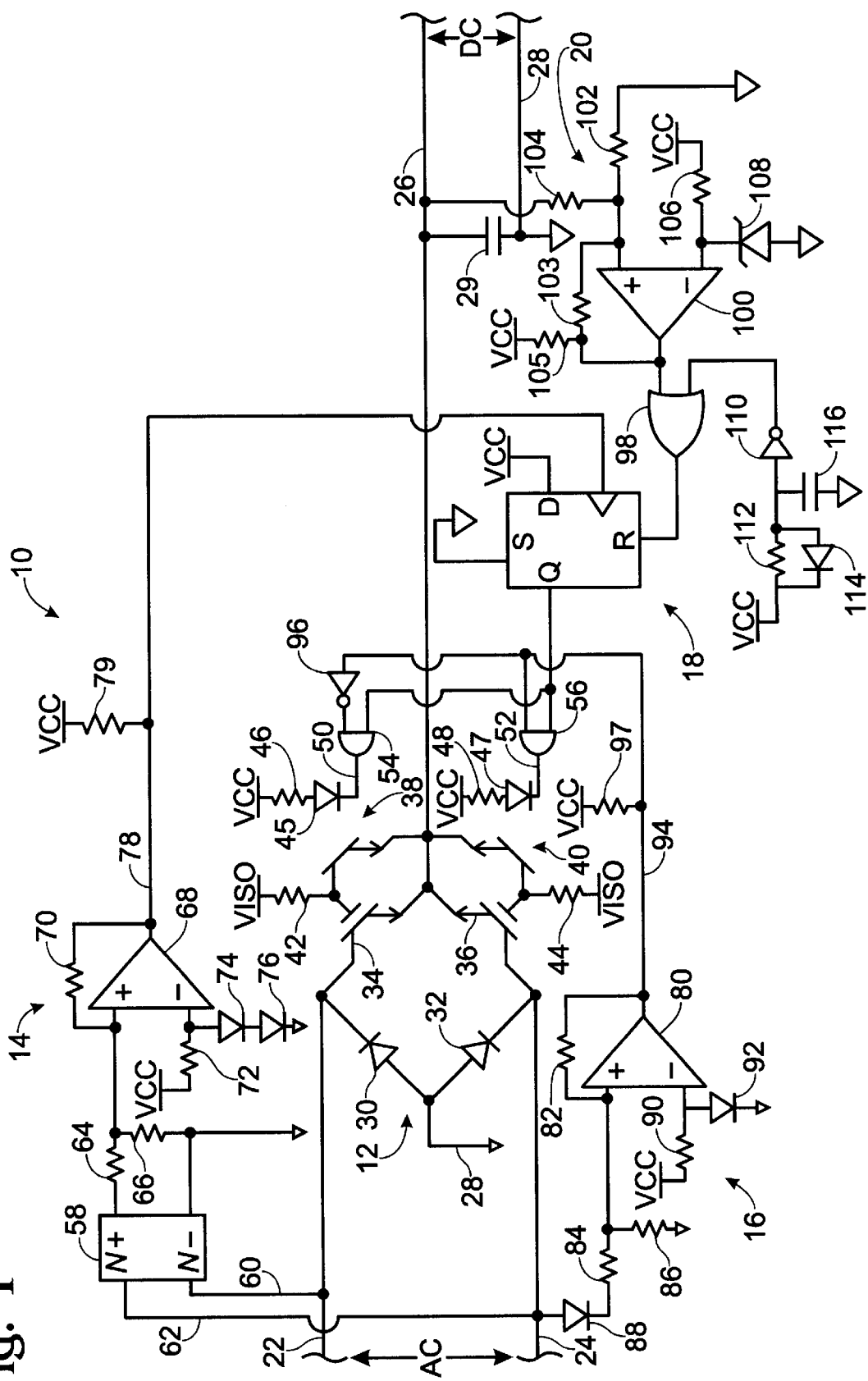

This invention pertains to an AC-to-DC converter circuit, and in particular, to such a circuit which employs a bridge rectifier featuring legs containing insulated-gate bipolar transistor (IGBT) switching/rectifying devices.

The converter of the present invention, in relation to the structure and operation of the mentioned bridge rectifier, is a very simple and economical structure, with respect to which the choice to employ IGBT devices in two of the legs in the bridge circuit results in significantly improved efficiency in operation over prior art converter circuits, and related, normal operation and with only modest heat loss. Cooperating with the bridge rectifier in the overall converter circuit is a zero-crossing tracker which collaborates with a flip-flop device to trigger operations of the IGBT devices. Preferably, such triggering taking place through opto-isolator structure. The specific design and disposition of the zero-crossing tracker and cooperating flip-flop in this invention is such that if, for some reason, the tracker fails in its operation, the overall operation of the bridge rectifier, and thus effectively of the converter as a whole, shuts down so as to remove, effectively, any DC output voltage. Additionally, the zero-crossing tracker, during normal operation, coacts with the mentioned flip-flop circuit, and with firing of the IGBT devices, to play a role in effecting reliable output voltage-level control.

Use, in accordance with this invention, of IGBT switching/rectifying devices in the bridge rectifier is to be distinguished from conventional use in converter rectifier circuits of so-called SCR devices. As is well known, an SCR device cannot be switched arbitrarily from a conducting state, and specifically cannot be turned off selectively with anything approaching the versatility and timing precision of the turn-on and turn-off operations that characterize the behavior of an IGBT device. In addition, IGBT devices are faster switching devices than are SCRs. As a consequence, conventional SCR rectifiers cannot be employed to create an AC-to-DC converter which has the remarkable flexibility and operation of the circuit of the present invention. Further, the "on" resistance to current flow in an IGBT device is extremely low, and specifically, much lower than that which is characteristic of an SCR device. Accordingly, an IGBT device turns out to be inherently a better-efficiency device, one requiring less energy to turn on, and one which generates less dissipatable heat during normal use.

All of these important advantages that are offered by use, according to this invention, of IGBT rectifying/switching devices, result in an overall structure wherein efficiency of operation, simplicity of packaging, and minimization of heat dissipation, are dramatically improved over the prior art offerings.

Various other objects and advantages that are attained by this invention will become more fully apparent as the description which now follows is read in conjunction with the accompanying drawings.

DESCRIPTION OF THE SINGLE DRAWING FIGURE

The single drawing FIGURE presented in this disclosure illustrates an AC-to-DC converter constructed in accordance with the present invention. This drawing specifically takes the form of a combined block/circuit diagram of the subject converter.

DETAILED DESCRIPTION OF, AND BEST MODE FOR CARRYING OUT, THE INVENTION

Turning now to the single drawing FIGURE, indicated generally at 10 is an AC-to-DC converter that is constructed in accordance with the present invention. Included in converter 10 is a central bridge rectifier (or rectifier circuit) 12, a zero-crossing tracker, or detector, 14, a positive/negative half-cycle detector 16, a D-type flip-flop 18, and a DC output-voltage monitor 20 (level monitoring circuit). Flip-flop 18 played a cooperating role in the action of monitoring DC output-voltage level, as will be seen. Circuit 10 is operatively furnished with two AC input terminals 22, 24, and with a pair of DC output terminals 26, 28—terminal 26 being the positive DC input terminal and terminal 28 being the negative DC output terminal. An output capacitor 29 is connected between terminals 26, 28. Rectifier 12, tracker 14 and monitor 20 are also referred to herein as an interactive behavior loop.

Making now more specific reference to bridge rectifier (or bridge) 12, this bridge includes four legs, one of which includes a single, conventional power-rectifier diode 30, another of which includes another, single similar diode 32, a third of which includes an integrated-gate bipolar transistor (IGBT) device 34 as a single component element in that leg, and the fourth leg of which includes another, like, single-component, IGBT device 36. Device 36 is essentially the same in construction as device 34. The orientations of these four respective leg components are clearly illustrated in the drawing, and it can be seen that diode 30 extends between AC input terminal 22 and DC output terminal 28, diode 32 extends between DC output terminal 28 and AC input terminal 24, IGBT device 34 extends between AC input terminal 22 and DC output terminal 26, and IGBT device 36 extends between DC output terminal 26 and AC input terminal 24.

According to the preferred embodiment of the invention which is now being described, and which is illustrated in the single drawing FIGURE, the two IGBT devices 34, 36 are specifically of the type which lacks an internal body diode. Further, and as will become apparent, these two IGBT devices have, as essentially a sole functionality in converter 10, switching (under control during operation) within the converter for the purpose of effecting an AC-to-DC rectification in bridge 12. Mention is here made of a specific category of IGBT device for the reason that this particular type of device offers all of the important advantageous operating features of an IGBT device, without the complicating presence of body diodes whose presence would require a more complicated circuit and triggering arrangement.

Among important advantages that are offered by IGBT-type switching devices in the setting now being described, are that these devices (1) are very fast in switching, (2) can be turned on and off arbitrarily and very precisely in time under trigger control and (3) offer a very low internal resistance, which makes them very efficient, low heat-generating components in the overall converter. IGBT devices, in addition, and, because of their low-heat generating propensity during normal use, do not require weighty, extensive and expensive heat sinking for heat dissipation purposes.

IGBT devices 34, 36 are triggered herein, respectively, and preferably, by conventional opto-isolators 38, 40, respectively. The emitters in opto-isolators 38, 40 are connected to DC output terminal 26, and the collectors in these devices are connected to the gates in IGBT devices 34, 36, respectively, as shown. Voltage bias for the junctions between the collectors in the opto-isolators and the gates in the IGBT devices is furnished as illustrated through biasing resistors 42, 44. The light-emitting diode portion 45 of opto-isolator 38 is biased conventionally through a biasing resistor 46, and the light-emitting diode portion 47 in opto-isolator 40 is biased through a biasing resistor 48, also conventionally. Triggering signals that are supplied effectively to the IGBT devices through opto-isolators 38, 40 are furnished on conductors 50, 52 to the cathodes in light-emitting diodes 45, 47, respectively. Conductors 50, 52 are connected to the output terminals in two AND gates which are shown at 54, 56, respectively, which gates directly deliver such triggering signals.

Zero-crossing tracker 14 herein includes an input, conventional AC-to-DC bridge circuit represented by block 58. The AC-input (left) side of bridge 58 is connected through conductors 60, 62 to AC input terminals 22, 24 respectively. The DC (right-side) output terminals of bridge 58 are connected to the opposite ends of a two-resistor voltage divider including resistors 64, 66. The junction between these two resistors extends to the non-inverting input terminal of a voltage comparator 68. Bridging between the output terminal and the non-inverting input terminal of comparator 68 is a feedback resistor 70, and connected to the inverting input terminal in this voltage comparator is the junction between a biasing resistor 72 and a pair of series-connected diodes 74, 76 which extend as shown between this inverting input terminal and ground. One should note that ground in the circuit in FIG. 1 is the same as DC output terminal 28. The output terminal of comparator 68 is connected to a conductor 78, whose further function will be explained shortly. Positive voltage bias for the output of comparator 68 is supplied through a resistor 79 which is connected as shown to conductor 78. Also to be explained shortly is the function that is performed in converter 10 by tracker 14.

Turning attention now to previously-mentioned positive/negative half-cycle detector 16, this detector includes a voltage comparator 80 whose non-inverting input terminal is connected to its output terminal through a feedback resistor 82, and is also connected to the junction between a pair of resistors 84, 86 that function as a voltage divider. The lower end of resistor 86 pictured in the drawing is connected to ground, and the left end of resistor 84 is connected, as shown, through a diode 88 to previously-mentioned AC input terminal 24. Voltage bias for the inverting input terminal in comparator 80 is furnished at the junction between a biasing resistor 90 and a single diode 92 which extends between this inverting input terminal and ground. The output terminal of comparator 80 is connected via a conductor 94 directly to one of the two input terminals in previously-mentioned AND gate 56, and through an inverter 96 to one of the two input terminals in previously-mentioned AND gate 54. Positive bias voltage for this comparator's output terminal is supplied to conductor 94 through resistor 97. The role played by detector 16 will be explained shortly.

Previously-mentioned flip-flop 18 has five operative terminals, four of these being labeled with the capital letters S, Q, D and R, and the fifth being represented by a small triangle. The Q terminal in flip-flop 18 is connected, as shown, directly to each of the other two inputs in AND gates 54, 56. The S terminal (known as the Set terminal) is connected to ground, and the R terminal (the Reset terminal) is connected to the output of an OR gate 98. The D terminal (Data terminal) is connected to an appropriate source of positive bias voltage. The fifth terminal, the one marked with a triangle, which terminal is the clock terminal, is connected to previously-mentioned conductor 78 which extends from the output of voltage comparator 68.

Completing a description of what is shown in FIG. 1, previously-mentioned DC output-voltage monitor 20 includes an voltage comparator 100 whose output terminal is connected to one of the two input terminals shown for OR gate 98. The non-inverting input terminal in comparator 100 is connected to the junction between a pair of resistors 102, 104 that function as a voltage divider acting between DC output terminal 26 and ground, as shown. A feed-back resistor 103 interconnects the output terminal of comparator 100 with its noninverting input. Positive bias for the comparator's output terminal is supplied through a resistor 105. The inverting input terminal in comparator 100 is connected to the junction between a biasing resistor 106 and a Zener diode 108. The right end of resistor 106 in the drawing FIGURE is connected to an appropriate source of positive biasing voltage, and the lower end of diode 108 is connected to ground.

Finally, the second ones of the two input terminals in OR gate 98 are connected through an inverter 110 and a resistor 112 to a suitable source of positive bias voltage. Connected across resistor 112, with the orientation shown, is a diode 114. A capacitor 116 extends between the left side of inverter 110 in the drawing FIGURE and ground.

Explaining now how converter 10 performs according to the invention, under normal operating conditions, and with reference to a specific, illustrative application with respect to which converter 10 has been designed to function herein, a single-phase AC input voltage, in the range of 110–120-volts is applied to input terminals 22, 24, and a desired DC output voltage, here about 160-volts, appears, and is applied, across DC output terminals 26, 28. One should recognize that while this AC input voltage range is typical for United States applications, other AC voltage ranges are employed in other areas of the world, and the converter of this invention is readily adaptable to any one of such other voltage ranges. Where necessary, ratings and operational parameters of the IGBT (and other) devices may be selected appropriately.

During successive half cycles of the AC input voltage, a pattern of high/low output voltages is supplied via voltage comparator 80 to conductor 94. This voltage pattern includes, effectively for each full cycle of the AC input voltage, two differentiated voltage states—a high-state and a low-state. Initiation of each high-state condition takes place each time the absolute value of the AC input voltage applied to the non-inverting input terminal in comparator 80 rises above the forward bias voltage of diode 92 (typically about 0.7-volts). This high-state voltage is applied directly to one of the two inputs in AND gate 56, and simultaneously, in an inverted form (through inverter 96), to one of the two inputs in AND gate 54. A consequence of this is that, during each full AC cycle, each of these two just-mentioned AND gate's inputs experiences a high-state voltage, followed by a low-state voltage, at the same time that the other gate's related input is in the respective opposite state.

Whenever each one of these input terminals is in a high-voltage state, the associated output of the associated AND gate is readied to go into a positive, high-voltage state if, during that time period, the associated AND gate's other input is also biased to a high-voltage state. As will be seen, this latter condition is under the control of flip-flop 18, and specifically under the control of the voltage state in existence on the Q output of the flip-flop.

When the output of either AND gate goes to a high-voltage state, the associated, connected opto-isolator conducts and applies a triggering/firing pulse to the connected IGBT device.

Thus, it is the operation of flip-flop 18, through controlling the condition on its Q output terminal, which determines whether either one of the IGBT devices is triggered and fired so-to-speak. It is the operation of half-cycle detector 16 that determines which of the IGBT devices is triggered to conduct. The way in which the circuit components are organized herein is such that, if either one of the IGBT devices is to be triggered during the positive half cycle of the AC input voltage, it is IGBT device 34 which is so triggered to conduct. Conversely, it is during the negative half cycle of the AC input voltage that IGBT device 36 may be so triggered.

So long as the DC output voltage is equal to or greater than a predetermined desired output voltage, such as the 160-volts mentioned earlier, neither one of the IGBT devices is triggered at all. The reason, of course, for this is, that under such circumstances, the Q output terminal of the flip-flop is held in a low-voltage state. Considering why this is the case, and looking at the circuitry immediately associated with flip-flop 18, with the Set terminal (S) grounded as pictured, the condition residing in the flip-flop is such that the voltage state on the Reset terminal (R) has priority over the voltage state on the Clock (triangle) terminal. So long as the DC output voltage is in the condition just mentioned above, namely equal to or greater than the desired nominal DC output voltage for the converter, then, through the combined operations of voltage comparator 100 and OR gate 98, the Reset input in the flip-flop is held in a high-voltage state. This state effectively dominates, and prevents the flip-flop from responding in any manner to applied voltage at the Clock input terminal. Within the operation of the flip-flop, when the Reset terminal is held in a high-voltage state, the Q output terminal is held in a low-voltage state, and as was mentioned earlier, this condition prevents any triggering signals from being sent from the output terminals of AND gates 54, 56.

When, however, the DC output voltage drops below the predetermined nominal DC output voltage, the voltage condition at the Reset input terminal in the flip-flop changes from a high-voltage state to a low-voltage state, and this now prepares the flip-flop to respond to voltage changes applied to its Clock input to create related voltage-state changes on its Q output terminal. Accordingly, under these circumstances, the flip-flop is enabled to respond to voltage levels applied via conductor 78 to its Clock input to switch the voltage condition appearing on the Q output, thus to trigger, through the appropriate AND gate, the associated IGBT device.

Explaining the role now played in converter 10 by zero-crossing tracker 14, when tracker 14 is operating properly, as it is expected to do under normal conditions, the tracker produces a series of pulses on conductor 78 whose leading edges are timed generally with (actually just slightly after) the moments of zero-crossing of the AC voltage applied to input terminals 22, 24. The leading edges of these pulses, so made available on conductor 78, are the events which can be responded to at the Clock input terminal of the flip-flop, so long as the flip-flop's Reset terminal is not held in a high-voltage state. The presence of series-connected diodes 74, 76, extending as shown from the inverting input of voltage comparator 68 to ground, establishes, effectively, the point in time during a half cycle of the AC input voltage at which an output pulse is created on conductor 78. This timing condition is effectively set by the stacked value of the two forward bias voltages of diodes 74, 76, which stacked voltage condition is essentially twice that of the forward bias voltage condition of single diode 92. Thus, pulses on conductor 78 which are capable of effecting the triggering/firing of the IGBT devices are made present every time (just shortly after), a zero-crossing of the input AC voltage occurs. The presence of stacked diodes 74, 76 which are associated with comparator 68, in relation to single diode 92 which is associated with voltage comparator 80, assures that a clock pulse is applied to conductor 78 only after circuit 16 has determined whether a particular zero-crossing is leading into a positive half cycle or into a negative half cycle of the AC input voltage. Thus, the half-cycle detector pre-establishes which, if either one of the two, of the IGBT devices is to be fired. The zero-crossing tracker produces a pulse that, if permitted to change the condition of the voltage on the Q output terminal in the flip-flop, does so in a manner which causes a firing pulse to be directed to that IGBT device which has been "pre-established" by the half-cycle detector.

And so, when the output voltage condition drops below the desired nominal output DC voltage, IGBT devices 34, 36 fire in succession to operate as rectifiers within bridge 12, thus to replenish charge on output capacitor 29, and thus to lift the DC output voltage level back toward the desired nominal DC output voltage.

The firing response of the IGBT devices in the circuit so far described, and with respect to the operation so far presented, takes place with great precision, and very quickly in time. Accordingly, converter 10 operates with a high degree of precision to maintain a desired-level DC output voltage.

An important safety feature of converter 10, mentioned earlier herein, is that, effectively, the operation as a whole of this converter is shut down if something goes awry with the operation of zero-crossing tracker 14. If something does fail in the operation of the zero-crossing tracker, no matter what the operating circumstances of any other component in converter 10 might be at that time, no clocking pulses will be applied to the clock input terminal in the flip-flop, and consequently, no repetitive state changes, that is voltages state changes, will occur on the Q output terminal of the flip-flop, and there will be no firing of the IGBT devices. Effectively, under such a condition, operation of the converter shuts down.

Accordingly, the present invention proposes a unique AC to DC converter which takes advantage of several important operating features of IGBT devices, and preferably such devices which have no body diodes, to produce a rapidly responding, efficiently operating, low-heat generating rectification functionality between a pair of AC input lines and a pair of DC output lines. Highly precise voltage control, coupled with rapid firing capability for the IGBT devices, enables a properly operating converter built in accordance with this invention to maintain a DC output voltage very precisely at a desired level. Cooperating in the converter to promote this kind of precision voltage conversion operation are, of course, zero-crossing tracker 14 and half-cycle detector 16, both along with flip-flop 18. The circuit's fail-safe characteristic of effectively shutting down in the absence of proper operation of the zero-crossing tracking detector provides an important safety feature with respect to voltage output at the DC output terminals 26, 28. In fact, with sustained non-operation of the voltage tracker, DC output voltage essentially bleeds ultimately to zero.

While IGBT devices of the style not having internal body diodes are preferred, the features of this invention can be implemented, if desired, utilizing body-diode possessing IGBTs.

Accordingly, while a preferred embodiment and manner of practicing the present invention have been illustrated and described herein, it will be appreciated that variations and modifications may be made without departing from the spirit of the invention.

I claim:

1. An AC-DC converter comprising

AC input terminals,

DC output terminals, and intermediate said AC and DC terminals, a bridge rectifier operatively interposed said terminals, and including a first pair of legs connected in series and a second pair of legs connected in series, wherein the first pair of legs is immediately adjacent to and connected in parallel to the second pair of legs, and wherein each leg of the first pair of legs includes an insulated-gate bipolar transistor (IGBT) independent of a diode and each leg of the second pair of legs contains a diode independent of an IGBT.

2. The converter of claim 1, wherein each IGBT device is one which lacks an internal body diode.

3. An AC-to-DC converter comprising:

AC input terminals,

DC output terminals, and an interactive-behavior circuit loop including operative connections to said AC and DC terminals, and in addition, a rectifier operatively interposed said terminals, and including a first pair of legs connected in series and a second pair of legs connected in series, wherein the first pair of legs is immediately adjacent to and connected in parallel to the second pair of legs, and wherein each leg of the first pair of legs includes an insulated-gate bipolar transistor (IGBT) independent of a diode and each leg of the second pair of legs contains a diode independent of an IGBT, a DC output-voltage level-monitoring circuit operatively interposed said DC output terminals and said rectifier, and a zero-crossing tracker operatively interposed said AC input terminals and said level-monitoring circuit.

4. A regulated-voltage AC-to-DC converter comprising

AC input terminals,

DC output terminals, a bridge rectifier including a first pair of legs connected in series and a second pair of legs connected in series, wherein the first pair of legs is immediately adjacent to and connected in parallel to the second pair of legs, and wherein each leg of the first pair of legs includes an insulated-gate bipolar transistor (IGBT) independent of a diode and each leg of the second pair of legs contains a diode independent of an IGBT, and a DC output-voltage-level monitoring circuit operatively interposed said output terminals and said IGBT devices, operable to effect switching of said devices in response to DC output voltage level, and in a manner tending to maintain output-level-constancy of that output voltage.

5. The converter of claim 4, wherein an operative connection exists between said monitoring circuit and said IGBT switching devices via opto-isolator structure.

6. The converter of claim 5 which further includes a zero-crossing tracker operatively connected to said input terminals and to said monitoring circuit, effective to control the operation of at least a portion of the monitoring circuit.

7. An AC-to-DC converter comprising

AC input terminals,

DC output terminals, a rectifier operatively interposed said terminals, and including a first pair of legs connected in series and a second pair of legs connected in series, wherein the first pair of legs is immediately adjacent to and connected in parallel to the second pair of legs, and wherein each leg of the first pair of legs includes an insulated-gate bipolar transistor (IGBT) independent of a diode and each leg of the second pair of legs contains a diode independent of an IGBT, a zero-crossing tracker operatively connected to said input terminals, and circuit structure operatively interconnecting said rectifier and said zero-crossing tracker, responsive to cessation of normal operation of said tracker to disable the functionality of said rectifier circuit, thus to close off the supply of DC output voltage from said rectifier circuit to said DC output terminals.

8. The converter of claim 7, wherein said circuit structure includes a flip-flop circuit.

9. The converter of claim 7, wherein said rectifier circuit includes insulated-gate bipolar transistor (IGBT) switching/rectifying devices.

* * * * *